United States Patent
Shakagori et al.

(10) Patent No.: US 7,357,372 B2
(45) Date of Patent: Apr. 15, 2008

(54) SEAT RING FOR BUTTERFLY VALVE

(75) Inventors: Akihiro Shakagori, Nobeoka (JP); Yukitomo Yamamoto, Kitakyushu (JP)

(73) Assignee: Asahi Organic Chemicals Industry Co., Ltd., Miyazaki-ken (JP)

( * ) Notice: Subject to any disclaimer, the term of this patent is extended or adjusted under 35 U.S.C. 154(b) by 0 days.

(21) Appl. No.: 10/536,740

(22) PCT Filed: Jan. 12, 2003

(86) PCT No.: PCT/JP03/15319

§ 371 (c)(1),
(2), (4) Date: Nov. 7, 2005

(87) PCT Pub. No.: WO2004/051122

PCT Pub. Date: Jun. 17, 2004

(65) Prior Publication Data

US 2006/0163520 A1    Jul. 27, 2006

(30) Foreign Application Priority Data

Nov. 29, 2002   (JP) ............................. 2002-349188

(51) Int. Cl.
*F16K 1/22* (2006.01)
(52) U.S. Cl. ....................... 251/306; 123/337
(58) Field of Classification Search ............... 251/305, 251/306, 307, 308; 123/336, 337
See application file for complete search history.

(56) References Cited

U.S. PATENT DOCUMENTS

| | | | | |
|---|---|---|---|---|
| 4,289,297 A | * | 9/1981 | Nakanishi | 251/306 |
| 5,876,015 A | * | 3/1999 | Schaeffer et al. | 251/305 |
| 6,702,257 B1 | * | 3/2004 | Mollmann | 251/306 |
| 7,080,820 B2 | * | 7/2006 | Eggleston et al. | 251/171 |

FOREIGN PATENT DOCUMENTS

| | | |
|---|---|---|
| JP | 3-29776 | 3/1991 |
| JP | 3-29777 | 3/1991 |
| JP | 3-62271 | 6/1991 |
| JP | 6-17946 | 1/1994 |
| JP | 7-12766 | 3/1995 |
| JP | 2001-124218 | 5/2001 |
| JP | 2001-214980 | 8/2001 |

* cited by examiner

*Primary Examiner*—John K. Fristoe, Jr.
(74) *Attorney, Agent, or Firm*—Jordan and Hamburg LLP

(57) ABSTRACT

A seat ring having a hollow cylindrical body portion with a flange surface as each of its side surfaces. The cylindrical body portion has stem through-holes above and below along a stem axial direction X and a stem penetrates said through-holes. An outer circumference of the body portion is formed in an elliptic shape with the stem axial direction X as its longitudial axis. The thickness of the body portion where the stem through-holes are provided is the maximum while the thickness of the body portion along an axis perpendicular to the longitudinal axis is the minimum.

6 Claims, 6 Drawing Sheets

SEAT RING FOR BUTTERFLY VALVE

TECHNICAL FIELD

This invention is in regards to a seat ring for butterfly valves suitable for use in piping lines at chemical plants, in water supply and sewerage systems, for agriculture and fishery, and so on. More details are as follows. The performance improvement of the seat ring seal near the stem through-hole without the increase in the stem's torque operation, and the performance improvement of countering fluid leaching through the gap between the stem through-hole on the inner circumference of the seat ring and the stem.

BACKGROUND ART

The butterfly valve known up until now is the one that by attaching an elastic seat ring to the inside of the hollow cylindrical body made of rigid material and inserting the valve plug, opens and closes by the seat ring crimping and separating due to the rotating stem. For the butterfly valve, what is used is a seat ring having a circular outer circumferential shape and an inner circumferential diameter formed smaller than the outer circumferential diameter of the valve plug by one size. However, there was a drawback to this butterfly valve. When the valve plug is crimped and sealed to the inner circumferential part, since the available surface pressure is low near the stem through-hole, the sealing effect is small with the same compression rate, making it vulnerable to leakage.

In order to solve the above problem, the seat ring as described in the Japanese Unexamined Utility Model Publication No. 3-62271 (FIG. 1, Pages 4 to 5) was developed. This is a seat ring for the butterfly valve to improve the sealing performance near the stem through-hole. As shown in FIGS. 5 to 7, it has a circumferential shaped protrusion 24 represented by a trajectory with a radius $R_1$ and $O_1$ as its center on its body circumference attaching surface 23 which is smaller in width than the body attaching surface 23. Furthermore, it is distinctive in that it has a circular protrusion 25 which is smaller in width than the above protrusion 24 and is decentered toward the stem axial direction X' on the surface of protrusion 24, has a center at a point $O_2$ decentered to the stem axial direction X' with respect to the center $O_1$, and is represented by a trajectory with a radius $R_2$ smaller than the above radius $R_1$. Due to this technology, a crushing margin near the stem through-holes 26 and 27 is made larger when the valve is blocked, allowing for the improvement of sealing performance.

However, with this type, as shown in a circular mark portion in FIG. 6 and in FIG. 7, with an outer circumferential shape of a seat ring 21, two circular outer circumferences with different diameters and center positions are brought into contact with the seat ring 21 and the body attaching portion, and a crossing portion 28 of the two outer circumferences is inflected, and not smooth. Therefore, the sealing pressure at the outer circumferential crossing portion 28 is smaller in the fully closed state, which leads to the possibility of leakage from the portion on the flow passage side. Moreover, at the pressure contact portion between the valve plug 22 and the seat ring 21 near the stem through-holes 26 and 27, with double protrusions of 24 of 25 and thickness changing as shown in FIG. 8, the available surface pressure (shown by an arrow) is not even. That constituted a problem of fluid leaching through the gap between the stem through-holes 26 and 27 of the seat ring 21 and the stem.

DESCRIPTION OF THE INVENTION

This invention was made in view of the above problems of the prior art, and its objective was to provide a seat ring for the butterfly valve whose valve-seat sealing performance near the stem through-hole and the sealing performance countering leaching of fluid through the gap between the stem through-hole on the inner circumference of the seat ring and the stem (hereinafter referred to as the "internal leakage from the stem through-hole") are improved without the increase of the stem's torque operation.

In order to achieve the above objective, with this invention, as shown in FIGS. 1 and 2, for the butterfly valve seat ring having a flange surface 6 on both its side surfaces of the hollow cylindrical body portion 5, an outer circumference 7 of the body portion 5 is formed in an elliptic shape with the stem axial direction X as its long axis, and an inner circumference 8 in a circular shape.

BEST CONFIGURATION FOR CARRYING OUT INVENTION

Figure 1:
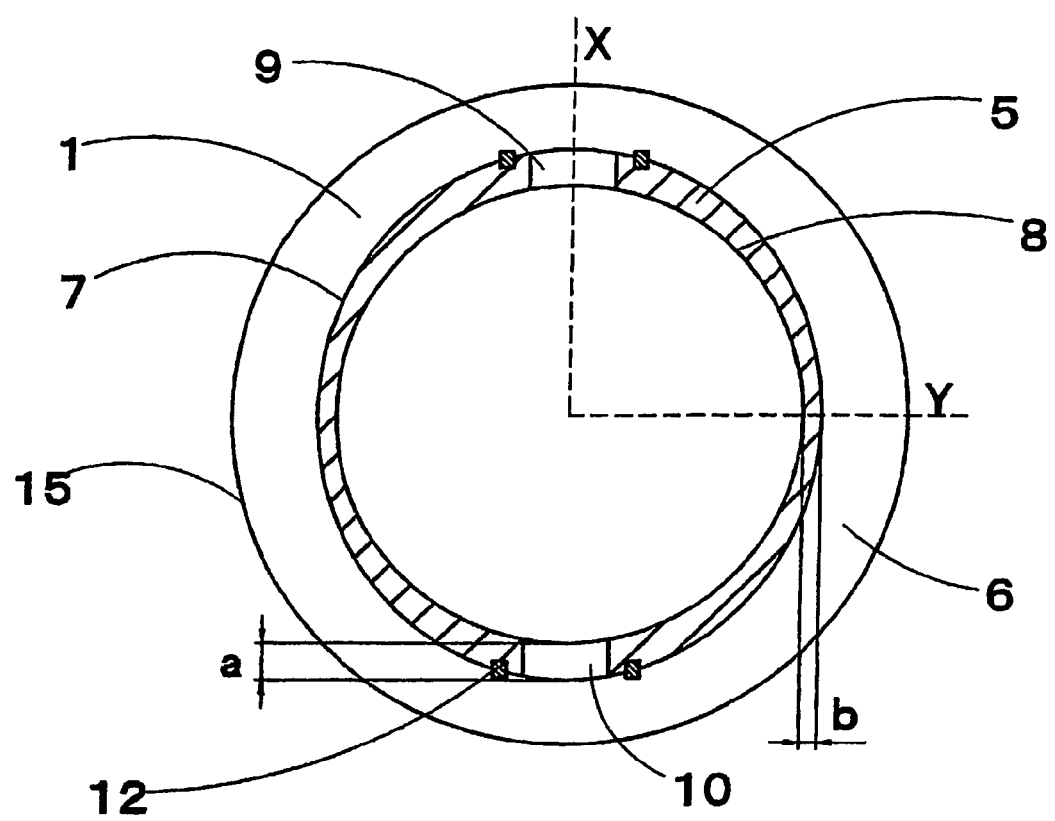
FIG. 1 is a longitudinal sectional view of the seat ring for the butterfly valve illustrating an embodiment of this invention.
Figure 2:
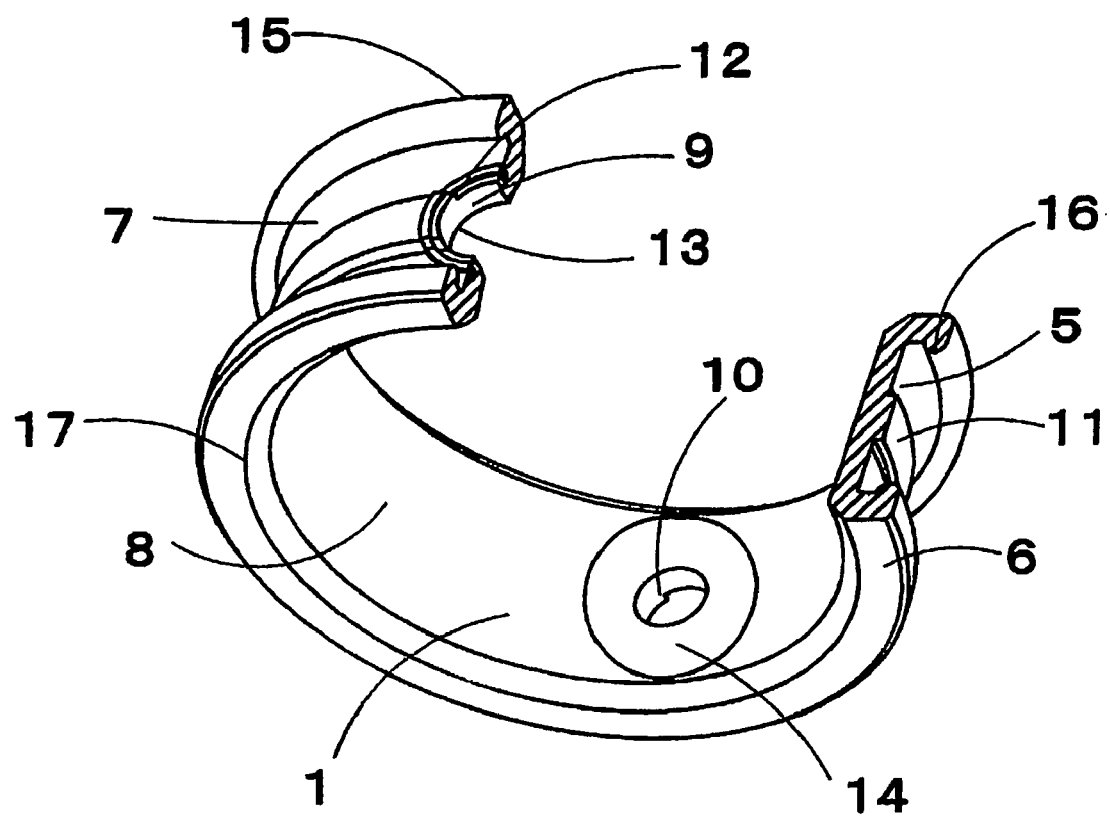
FIG. 2 is a partially broken perspective view of this embodiment's seat ring for the butterfly valve.

In FIGS. 1 and 2, 1 is a seat ring made of EPDM, in which a hollow cylindrical body portions 5 and a flange surface 6 on both its side surfaces are formed integrally. Above and below the stem axial direction X on the body portion 5, there are stem through-holes 9 and 10 through which a stem 3, which will be described in detail later, penetrates. An outer circumference 7 of the body portion 5 is formed in an elliptic shape with the stem axial direction X as its long axis. More specifically, this is there so that the thickness of the portion on which the stem that has through-holes 9 and 10 becomes the maximum while the thickness b of the horizontal portion when both of them are moved by 90 degrees becomes the minimum. It is preferable that the ratio of the thickness dimension of the stem axial direction X from the inner circumference 8 to the thickness dimension b of the direction Y perpendicular to the stem axis from the inner circumference 8 is formed at 1.01:1 to 2:1. If it is larger than 1.01:1, the stem's torque operation will not increase and valve-seat leakage near the stem through-holes 9 and 10 will unlikely occur. Also, if it is smaller than 2:1, there is no problem with assembling performance and leakage from the valve seat near the direction Y perpendicular to the stem axis and internal leakage from the stem through-holes 9 and 10 will unlikely occur. Moreover, it is more preferable that the ratio is formed at 1.03:1 through 1.43:1.

The center of the outer circumference 7 has an annular protrusion 11 with a rectangular sectional shape, and is fitted into a groove on the inner circumferential surface of valve plug 2, which will be described in detail later, so that the seat ring 1 does not move. A ring 12 made of SUS is attached on the periphery of the stem through-holes 9 and 10 of the outer circumference 7. Also, the inner circumference 8 from which a valve plug 4, which will be described in detail later, is crimped and separated is formed as a flat surface in a circular shape, and the spherical shape boss portions 13 and 14 with a shape corresponding to the valve plug 4 are provided on the periphery portion of the stem through-holes 9 and 10, so that the valve-seat sealing performance improves. An outer circumference 15 of a flange surface 6 put integrally on both sides of the above body portion 5 is formed in a circular shape, and a lug portion 16 provided on the upper end of the flange surface 6 with protruding inwards is fitted to the outer circumferential surface of the valve plug 2, and prevents the seat ring 1 from moving. Since the inner circumference of the opening 17 provided at the center of the valve plug 2 is a circular shape while the outer circumference 7 of the seat ring 1 is an elliptic shape, when the seat ring 1 is fitted into the valve plug 2, a flow passage 18 formed on the inner circumference 8 of the seat ring 1 is an elliptic shape with the stem axial direction X as its short axis.

In this embodiment, the material of the seat ring 1 is EPDM, but it is not necessarily limited to this, and rubber such as NBR or a synthetic resin such as PVDF may be used as long as there is no problem with strength or corrosion resistance. Also, in this embodiment, the annular protrusion 11 is put on the outer circumference 7 of the seat ring 1, a ring 12 around the stem through-holes 9 and 10, and a lug portion 16 on the flange surface 6, respectively, but they need not be provided especially if there is no problem with performance.

Each embodiment of this invention will be described below based on drawings, but needless to say, this invention is not limited to these embodiments.

Figure 3:
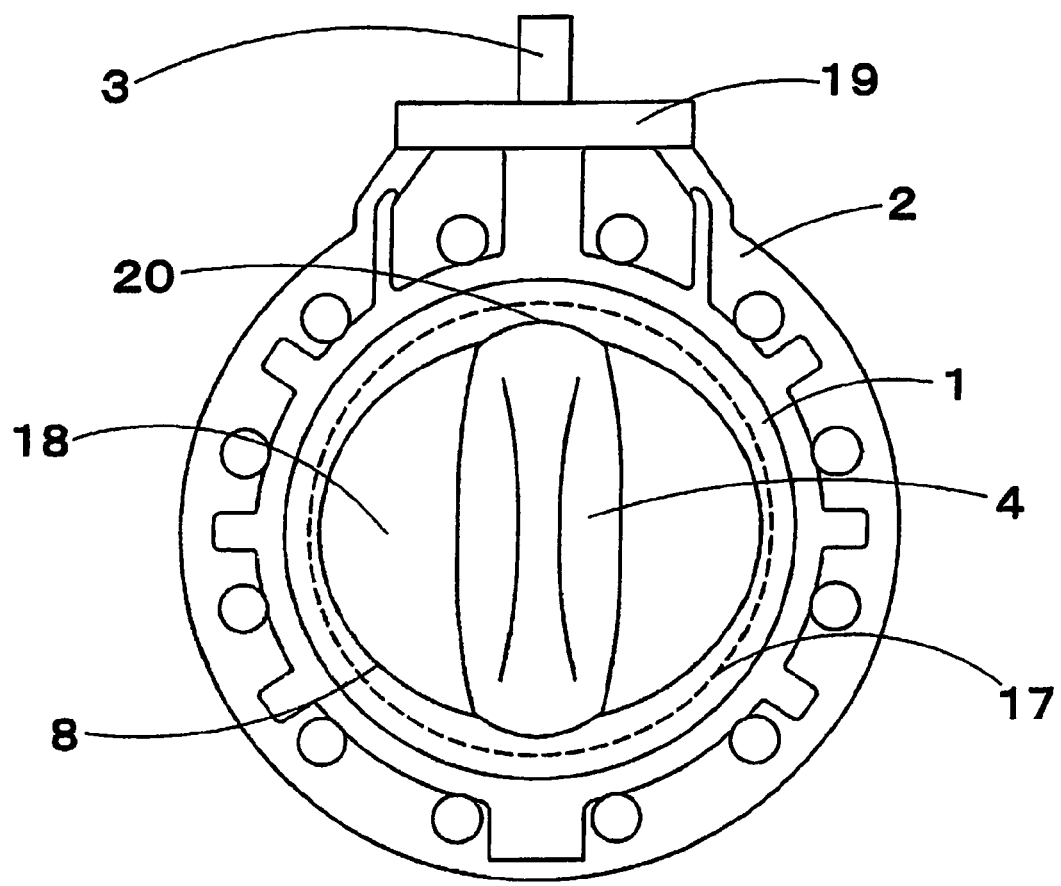
FIG. 3 is a front view showing the butterfly valve in the opened state, with this embodiment's seat ring attached.

FIG. 3 is a front view showing the butterfly valve in the opened state, with this embodiment's seat ring attached. In FIG. 3, 2 is a valve plug made of PP which has an almost disk shaped top flange 19 protruding toward the outer circumference on its top. A circular shaped opening 17 is provided at the center of the valve plug 2, and on the inner circumferential surface of the opening 17, a seat ring 1 is made attachable. A recess portion is provided at the center of the inner circumferential surface of the opening 17, and has a recess portion so that the protrusion 11 at the center of the outer circumference of the seat ring 1 can be fitted to it. If there is no protrusion 11 at the center of the outer circumference 7 of the seat ring 1, it is not unnecessary to provide a recess portion at the center of the inner circumferential surface of the opening 17.

The stem 3 shown in FIG. 3 is a stem made of SIS403, and the upper end of the stem 3 is arranged so that it is protruding from the center of the top flange 19 provided on the top of the valve plug 2. Also, the center of the stem 3 is closely penetrated by the valve plug 2 and the seat ring 1 in a rotatable state.

The valve plug 4 shown in FIG. 3 is a valve plug in a circular shape made of PP arranged at the center inside the valve plug 2 and supported by the stem 3 penetrating the center of the valve plug 4 disabling rotating. The valve plug 4 rotates within the valve plug 2 along with the rotating of the stem 3, and when the outer circumferential edge 20 of the valve plug 4 is crimped and separated from the inner circumference 8 of the seat ring 1, the valve opens and closes.

Next, the actuation of the butterfly valve to which this embodiment's seat ring is attached, is described.

Figure 4:
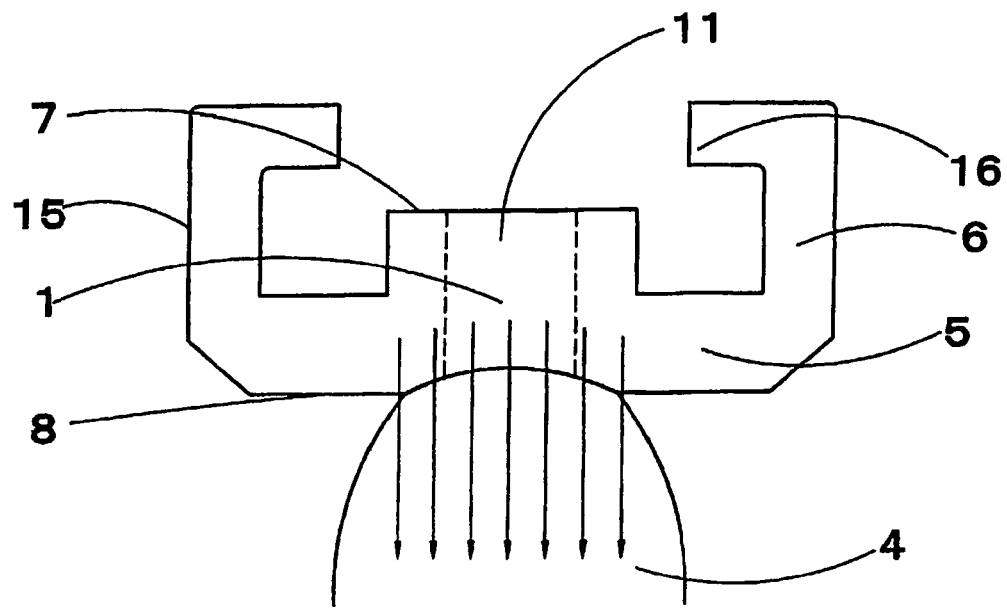
FIG. 4 is a conceptual diagram of the available surface pressure between the valve plug and the seat ring in FIG. 3.
Figure 5:
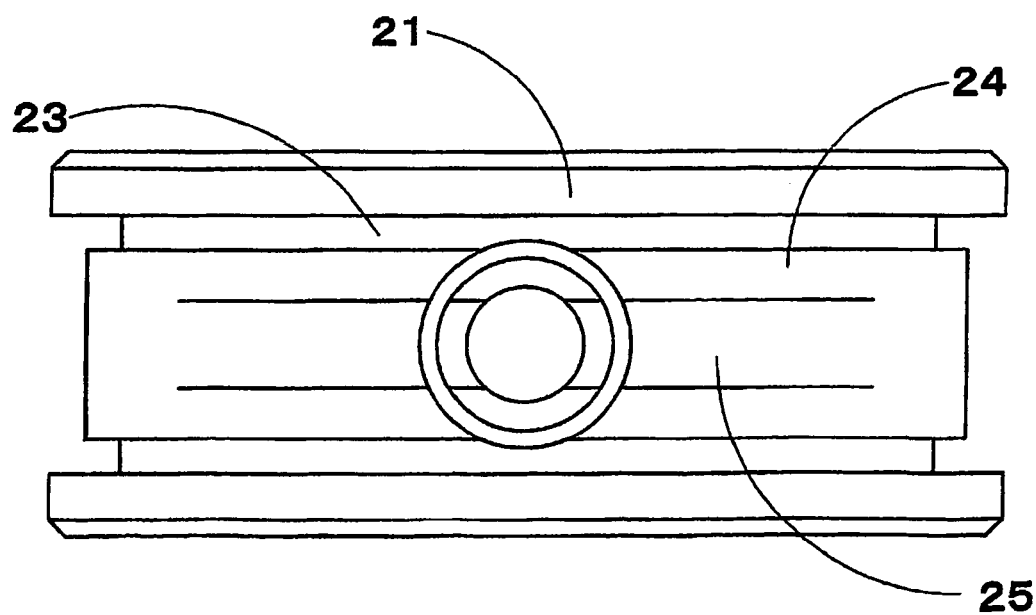
FIG. 5 is a plan view of a conventional seat ring.
Figure 6:
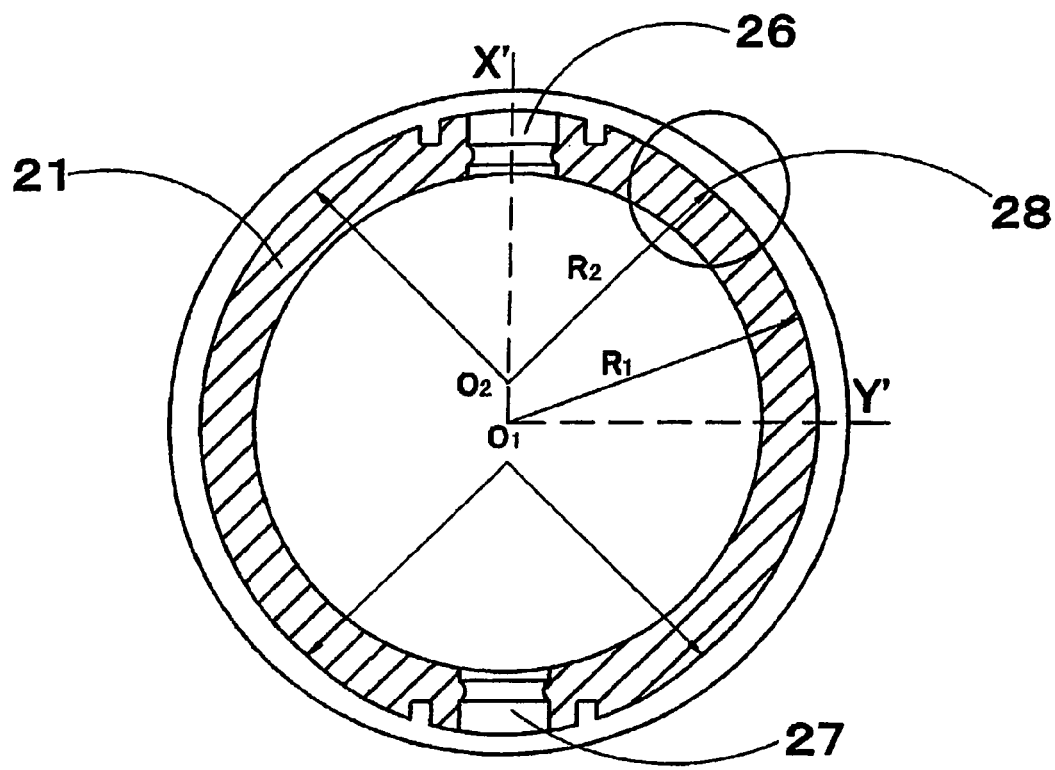
FIG. 6 is a longitudinal sectional view of the conventional seat ring.
Figure 7:
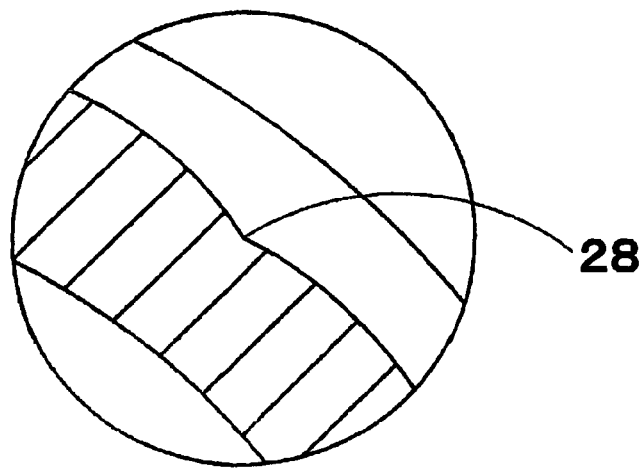
FIG. 7 is an enlarged view of FIG. 6's essential part.
Figure 8:
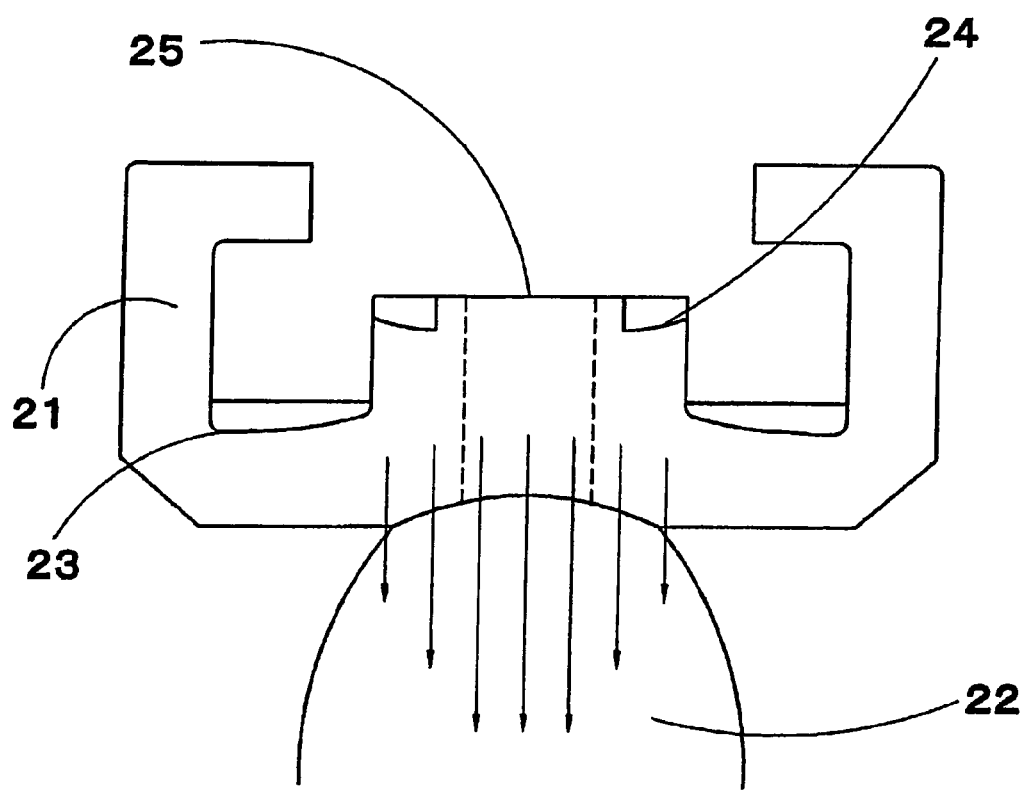
FIG. 8 is a conceptual diagram of the available surface pressure between the valve plug and the seat ring in a conventional butterfly valve.

When the stem 3 is rotated from the valve's fully opened state in FIG. 3 the valve plug 4 rotates along with it, and the outer circumferential edge 20 of the valve plug 4 is crimped into the inner circumference of the seat ring 1 and fully closes. At this time, the outer circumferential edge 20 of the valve plug 4 seals the inner circumference 8 of the seat ring 1 as if crushing it. However, since the outer circumference 7 of the seat ring 1 is formed in an elliptic shape with the stem axial direction X as its long axis, the crushing margin of the inner circumference 8 of the seat ring 1 by the outer circumferential edge 20 of the valve plug 4 becomes larger by a portion raised near the stem through-holes 9 and 10. Therefore, the valve-seat sealing performance near the stem through-holes 9 and 10 are improved. Moreover, as shown in FIG. 4, since the annular protrusion 11 at the center of the outer circumference 7 is formed in a rectangular sectional shape, the thickness is even and the available surface pressure also becomes even (shown by an arrow), whereby internal leakage through the stem through-holes 9 and 10 will unlikely occur. Also, since the crushing margin of the inner circumference 8 of the seat ring 1 in the direction Y perpendicular to the stem axis by the outer circumferential edge 20 of the valve plug 4 is provided at the required minimum to secure the valve-seat sealing performance, the stem's torque operation stays small, and the valve-seat leakage in the direction Y perpendicular to the stem axis does not occur.

As this invention is constituted as above, the following effects can be obtained.

Since the outer circumference of the seat ring is formed in an elliptic shape with the stem axial direction as its long axis, the valve-seat sealing performance near the stem through-holes and the sealing performance countering the leaching of fluid through the gap between the stem through-hole of the seat ring inner circumference and the stem can be improved without the increase of the butterfly valve's stem's torque by 30 to 50% as compared with conventional cases.

INDUSTRIAL APPLICABILITY

As described above, this invention, the seat ring for the butterfly valve, can be used for piping lines at chemical plants, in water supply and sewerage systems, for agriculture and fishery, and so on, with its seat ring's improved valve-seat sealing performance near the stem through-hole and a sealing performance to counter fluid from leaching through a gap between the stem through-hole in the seat ring inner circumference and the stem without the increase in the stem's torque operation.

The invention claimed is:

1. A seat ring assembly for a butterfly valve comprising:
   a tubular body portion defining a valve body axis along a tubular direction of the tubular body portion, the tubular body portion having two side flange surfaces disposed at opposing body portion ends, said tubular body portion having at least one stem through hole extending in a radial direction of said tubular body portion and defining a stem axis;
   an outer circumference portion of said tubular body portion being formed having an elliptic shape taken in a plane perpendicular to said valve body axis with a stem axial direction as a longitudial axis of said elliptic shape;

an inner circumference portion of said body portion formed having a circular shape taken in the plane perpendicular to said valve body axis and a constant radius;

an annular protrusion protruding radially outwardly from an axial center of said outer circumference portion of said body portion;

a valve plug body defining a circular through valve body opening, said tubular body portion being installed in said circular through valve body opening in a compressed state such that said outer circumference portion is compressed at areas intersected by said longitudinal axis of said elliptic shape such that said inner circumference portion is deformed from said circular shape to an elliptic shape; and wherein a ratio of a first thickness dimension of the body portion from the inner circumference portion to the outer circumference portion in the stem axial direction to the thickness dimension in the direction perpendicular to the stem axis from the inner circumference portion to the outer circumference portion is 1.01:1 to 2:1.

2. The seat ring assembly for a butterfly valve according to claim 1, said annular protrusion having a rectangular sectional shape.

3. The seat ring assembly for a butterfly valve according to claim 1, wherein said at least one stem through hole includes two stem through-holes, each of said stem through holes having on a periphery portion a boss portion.

4. The seat ring assembly for a butterfly valve according to claim 1, further comprising a lug portion on an upper end of each flange surface.

5. The seat ring assembly for a butterfly valve according to claim 1, wherein said tubular body is made of at least one of EPDM, NBR or PVDF.

6. The seat ring assembly for a butterfly valve according to claim 1, wherein said at least one stem through hole includes two stem through-holes, each of said stem through-holes having a ring.

* * * * *